(12) United States Patent
Yen

(10) Patent No.: US 7,519,743 B2
(45) Date of Patent: Apr. 14, 2009

(54) MULTIMEDIA STORAGE AND COMMUNICATION DEVICE AND ITS DETERMINING METHOD

(75) Inventor: Sheng-Shun Yen, Taipei (TW)

(73) Assignee: Power Quotient International Co., Ltd., Taipei Hsien (TW)

( * ) Notice: Subject to any disclaimer, the term of this patent is extended or adjusted under 35 U.S.C. 154(b) by 337 days.

(21) Appl. No.: 11/014,824

(22) Filed: Dec. 20, 2004

(65) Prior Publication Data

US 2006/0026332 A1 Feb. 2, 2006

(30) Foreign Application Priority Data

Aug. 2, 2004 (TW) ............... 93123110 A

(51) Int. Cl.
*G06F 3/00* (2006.01)
(52) U.S. Cl. .............. 710/14; 710/61; 710/62; 710/313; 711/115
(58) Field of Classification Search .......... 710/313, 710/14, 61, 62
See application file for complete search history.

(56) References Cited

U.S. PATENT DOCUMENTS

| | | | |
|---|---|---|---|
| 6,557,754 B2 * | 5/2003 | Gray et al. ............... | 235/375 |
| 6,581,122 B1 * | 6/2003 | Sarat ........................ | 710/301 |
| 6,824,063 B1 * | 11/2004 | Wallace et al. ............ | 235/487 |
| 7,011,247 B2 * | 3/2006 | Drabczuk et al. ......... | 235/451 |
| 7,106,337 B2 * | 9/2006 | Lu ............................ | 345/536 |
| 2005/0086408 A1 * | 4/2005 | Hsieh ........................ | 710/301 |

OTHER PUBLICATIONS

SD Group, Physical Layer Specification, Apr. 15, 2001, SD Group, Part 1, pp. 6-8.*
Judie Hughes, Intelligent Stick USB Drive: Gadgeteer Hands On Review, Nov. 6, 2003, pp. 2-3.*

* cited by examiner

*Primary Examiner*—Henry W. H. Tsai
*Assistant Examiner*—Elias Mamo
(74) *Attorney, Agent, or Firm*—Ming Chow; Sinorica, LLC

(57) ABSTRACT

The present invention is related to an interface design for multimedia data transmitting, which can provide a working interface in a data storing device or a communication device, using the working interface can provide the connecting facility between a multimedia device and computer system and improve the traditional high speed differential signals to portable digital data processing device. The present invention also provides a multimedia storage device, being inserted into a connector of a computer device or a portable device so that the computer device can transmit data to or receive from the portable device, wherein, the multimedia storage device comprises: printed circuit board, for conveying the following elements, having at least one terminal been formed on one end of the printed circuit board and exposed outwardly, wherein one end of the printed circuit board can be inserted into the connector; controller, positioned on the printed circuit board and coupled to the terminal, a working interface of the controller having a parallel data transmission with synchronous clock mode and a differential signal transmission mode, for controlling adaptive data transmission rate and power consumption; and storage unit, for storing data.

10 Claims, 5 Drawing Sheets

| PIN | Signal | PIN | Signal |
|-----|--------|-----|--------|
| P1 | $V_{Power}$ | P6 | D3 |
| P2 | D0 | P7 | D4 |
| P3 | D1 | P8 | CLK |
| P4 | GND | P9 | D5 |
| P5 | D2 | P10 | CMD |

| Command Index | Type | Argument | Name |
|---|---|---|---|
| CMD6 | Addressed Command | [31:26] Set to 0<br>[25:24] Access<br>[23:16] Index<br>[15:8] Value<br>[7:3] Set to 0<br>[2:0] Command Set | Switch |

FIG. 3

MULTIMEDIA STORAGE AND COMMUNICATION DEVICE AND ITS DETERMINING METHOD

BACKGROUND OF THE INVENTION

1. Field of the Invention

The present invention relates to a multimedia storage and communication device and its judgment method and, more particularly, relates to a multimedia storage and communication device that can change its operation mode to a suitable signal interface mode so as to control the transmission rate and power consumption of the multimedia storage and communication device according to the control signal received from a host system.

2. Description of the Related Art

In general, there are many interfaces existing between small size memory card and host or portable electrical device, for example the CFC (Compact Flash Card) or SD (Secure Digital Card)/MMC (Multi-Media Card) are the popular two of them. However, the new generation memory cards with USB interface have the advantage of high transmission rate, such as the Express card designed by Intel cooperation and Intelligent Stick system designed by PQI®. The traditional intelligent Stick is a memory card with USB interface, and the USB 2.0 version interface has a transmission rate up to 60 Mbytes/second, however, it consumes more power than USB 1.1 version interface. Due to not every portable electronic device needs such high transmission rate, such as MP3 player. The traditional Intelligent Stick system only has USB 2.0 interface, which comprises $V_{BUS}$, D−, D+ and GND terminals and has 5.0V operation voltage, a set of differential signals consisted of D−, D+ and a transmission rate up to 60 Mbytes/second. Due to the traditional Intelligent Stick system with USB 2.0 interface has higher transmission rate and consumes more power, therefore, it is suitable applied to an application required mass transmission data, for example but not limited to high resolution digital camera or digital video recorder.

The MMC (Multi-Media Card, referred as MMC card hereinafter) is a protocol defined by MMC association, which is a low cost data storage and communication device designed for smart phone, digital camera, personal digital assistant, digital video recorder, MP3 player or electronic games. The MMC card comprises 7 pins (remarks: wherein a pin is reserved) and its currently version is version 4.0. The MMC version 3.2 and its former version have a 3.3V or 1.8V operation voltage, 1 bit data width with synchronous clock and 0-20 MHz or 26 MHz operation frequency. However, for increasing the transmission rate, the MMC version 4.0 increases the data width to 1 bit, 2 bits, 4 bits and 8 bits, 0-20 MHz, 26 MHz or 52 MHz operation frequency and a transmission rate up to 52 Mbytes/Second so that its pins is increased to 13. Thought the MMC version 4.0 has a transmission rate up to 52 Mbytes/Second, it is still slower than the USB 2.0 with 60 Mbytes/Second but consumes less power. Due to the MMC version 4.0 has lower transmission rate and consumes less power, therefore, it is suitable applied to an application required less transmission data, for example but not limited to MP3 player, the third generation mobile phone, which requires less transmission data and long standby time features.

For the general memory cards, most of their interfaces only has one signal type, such as the multimedia card just has an MMC interface with synchronized signal, the Intelligent Stick 2.0 just has one USB interface with differential signal, although they can be applied to portable electronic device for digital image or MP3 audio signals transmitting, however, using the USB interface with the higher transmission rate and more power consumption to transmit the MP3 signal is not a good design in power saving; or using the MMC interface with the lower transmission rate and less power consumption to transmit the video signal, though it saves power but loses video quality. Therefore, the user must make a decision when he (or she) buys the multimedia card with MMC interface or memory card with USB interface.

Therefore, we need a memory storage device that is compatible to the existing system and has suitable transmission rate and power consumption to overcome the aforesaid drawbacks.

SUMMARY OF THE INVENTION

The present invention has been accomplished under the circumstances in view. It is therefore the main object of the present invention to provide a multimedia storage and communication device, which eliminates the aforesaid drawbacks.

According to one aspect of the present invention, the first object of the present invention is to provide a newly interface technology-Intelligent Stick Interface (ISI) which includes differential and synchronized signals, and uses the new interface technology designing a multimedia storage and transmission or communication device, which can switch to a Multi-Media Stick (MMS) mode or a Smart USB (SUSB) mode according to a control signal received from a host system so as to control the transmission rate and power consumption of the multimedia storage device.

For achieving the aforesaid object, the multimedia storage device of the present invention comprises: a printed circuit board, for conveying the following elements, having at least one terminal been formed on one end of the printed circuit board and exposed outwardly, wherein one end of the printed circuit board can be inserted into the connector; a controller, positioned on the printed circuit board and coupled to the terminal, a working interface of the controller having a parallel data transmission with synchronous clock mode and a differential signal transmission mode, for controlling adaptive data transmission rate and power consumption; and a storage unit, positioned on the printed circuit board and coupled to the controller, for storing data.

According to another aspect of the present invention, another object of the present invention is to provide a method for determining the operation mode of aforesaid multimedia storage device, the method can determine and decide the multimedia storage device operating in either the MMS mode or Smart USB (SUSB) mode of the Intelligent Stick Interface (ISI) so as to control the transmission rate and power consumption of the multimedia storage device.

For achieving the aforesaid object, the method of the present invention comprises the steps of: a Power On Sequence (POS), including resetting the multimedia storage device into the MMS mode, at the meanwhile, detecting an MMS host existing or not when the multimedia storage device is inserted into the connector of a computer device or a portable device; if there is an MMS host existing then setting the multimedia storage device into the MMS mode; and if there is not an MMS host existing then setting the multimedia storage device into the SUSB mode and initializing a Chirp sequence and switching to the SUSB mode; a Mode Swap Sequence (MSS), including sending a change mode command (CHMD) to the controller when the host of computer device or portable device needs to change operation mode of the interface, while the controller of ISI receiving the command, enabling another mode and responding (AckCHMD)

to the host system via original mode for preparing mode switching, then the host actuating another mode and completely connecting mode; the controller of ISI changing the value of the register to the new mode and turning off a kernel circuit of the operation mode for entering a sleep status so as to reduce the power consumption.

The newly interface technology disclosed in the present invention is referred as an Intelligent Stick Interface (ISI), which comprises 10 signals and can support two operation modes: the MMS and SUSB mode. The 10 signals are $V_{Power}$, GND, D0, D1, D2, D3, D4, D5, CMD and CLK respectively, wherein the $\{V_{Power}, GND\}$ pair of signals are supporting the operation voltage of the interface, which must satisfy the 5.0V, 3.3V or 1.8V voltage level; the {D0, D1} pair of signals are differential signals and work in SUBS mode, which are compatible to the {D0, D1} signals of the USB interface. Due to the $V_{Power}$ is different to the $V_{BUS}$ of the USB (it must be and only be 5V), therefore, the required signal quality specification of the {D0, D1} is more strict than the {D−, D+} signals while transmitting in high transmission rate, especially, when the {D0, D1} signals are working under lower voltage mode. The {D2, D3, D4, D5} signals are parallel signals with synchronous clock and work in MMS mode, which can provide data transmitting. The {CLK} signal provides the required synchronous clock, which can select the suitable operating clock according to the flag value of the register. In the Intelligent Stick Interface (ISI) design, it could have 0~20 MHz and 26 MHz clock modes, which are lower than the clock specification of the MMC 4.0 specification, and the lower clock consumes less power. The {CMD} signal is a command signal, the command set is compatible to but not as same as the Card Command Class (CCC) of the MMC 4.0 specification. Therefore, in the ISI interface of the present invention, the $\{V_{Power}, GND, D0, D1\}$ signals consist of a SUSB operation mode; the $\{V_{Power}, GND, D0, D2, D3, D4, D5, CMD, CLK\}$ signals consist of an MMS operation mode. The ISI interface provides a CHMD (Change Mode) command to the host system for changing the operation mode (the SUSB mode or MMS mode) of the ISI interface.

Changing the operation mode of the ISI interface is the newly technology disclosed in the present invention, which can change the signal transmission mode of the interface according to the requirement of the host system. In the further, there are more portable electronic devices will integrate the multimedia function therein, such as mobile communication, wireless network service, MP3, MPEC4, H.264 etc, value added service. However, the aforesaid system services respectively have differential interface requirement, wherein, the mobile communication and MP3 require lower power consumption for getting longer standby time, and the MPEC4 and H.264 image services require higher data transmission rate so as to get higher quality image data. Therefore, it needs a single integrate multimedia storage device that can actively switch the interface operation mode.

The ISI interface technology integrates the differential signals technology and parallel signal technology with lower power consumption and provides mode-switching procedure to satisfy the aforesaid multimedia host systems that have differential requirements.

These and other features, aspects, and advantages of the present invention will become apparent by a review of the following detailed description of the preferred embodiment of the invention and by reference to the following drawings.

BRIEF DESCRIPTION OF THE DRAWINGS

FIG. 3 illustrates a format of the SWITCH command for setting the data width of the MMS mode according to one prefer embodiment of the present invention.

DETAILED DESCRIPTION OF THE PREFERRED EMBODIMENT

Figure 1:
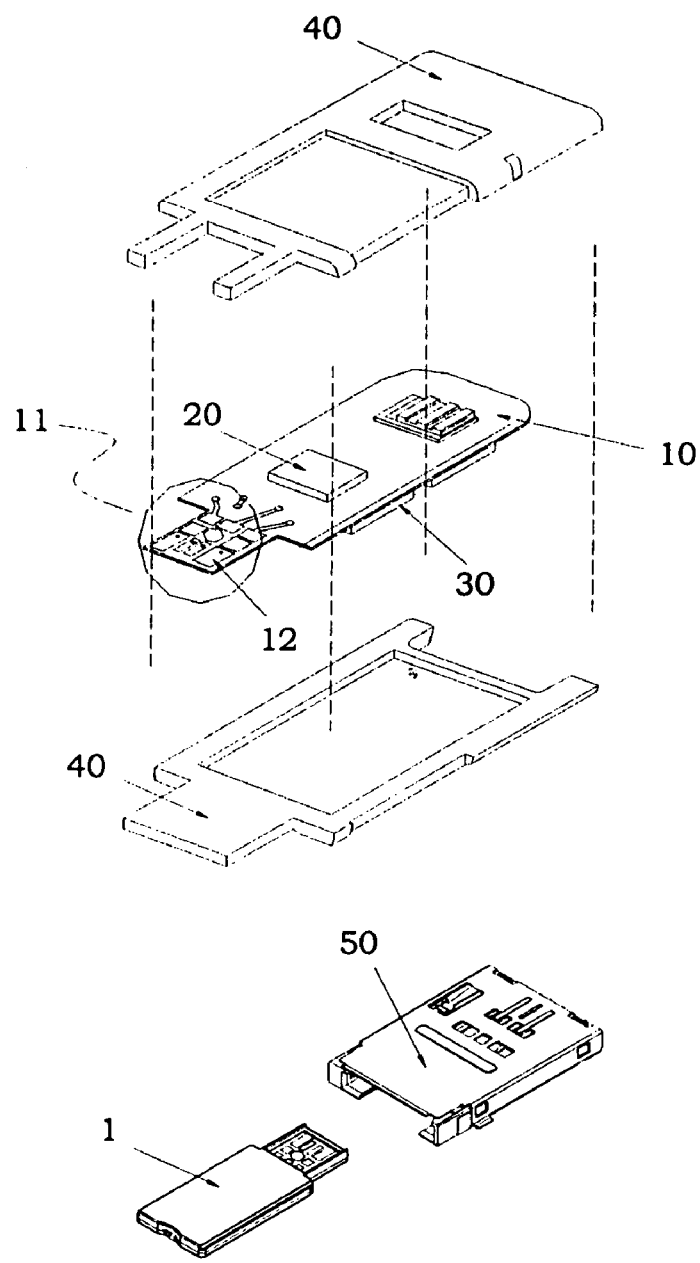
FIG. 1 illustrates an assembly view of the multimedia storage device according to one prefer embodiment of the present invention.

Referring to FIG. 1, which illustrates an assembly view of the multimedia storage device according to one prefer embodiment of the present invention. As shown in the Fig., the multimedia storage device of the present invention comprises: a printed circuit board 10; a controller 20; storage unit 30 and housing 40.

Figure 2:
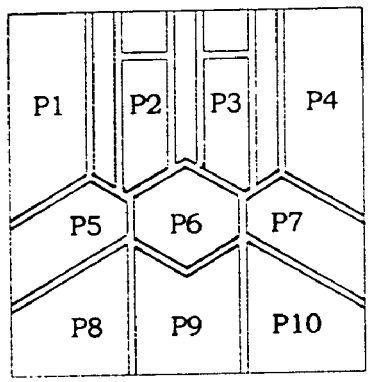
FIG. 2 illustrates an enlarge view of the terminals 12 of the multimedia storage device, which enlarges the signal layout of the front end and rear end of the terminals 12 according to one prefer embodiment of the present invention.

Wherein, the printed circuit board 10 is using for conveying the elements such as controller 20 and storage unit 30, having at least one terminal been formed on one end 11 of the printed circuit board 10 and exposed outwardly so that the exposed portion 11 can be inserted into a connector 50 of a host system, and the exposed portion 11 having a set of terminals 12 so that the terminals 12 can conduct with the terminals (not shown) of the connector 50 when the exposed portion 11 is inserted into. Wherein the terminals 12 are used to support the ISI interface, which comprises 10 terminals that are $V_{Power}$, GND, D0, D1, D2, D3, D4, D5, CMD and CLK respectively. Wherein, the $\{V_{Power}, GND, D0, D1\}$ signals are positioned and formed at the front end of the exposed portion 11 for consisting of a SUSB operation mode; the $\{V_{Power}, GND, D0, D2, D3, D4, D5, CMD, CLK\}$ signals are differential signal mode for providing a higher transmission rate mode service; the $\{V_{Power}, GND, D2, D3, D4, D5, CMD, CLK\}$ are positioned and formed at the rear end of the exposed portion 11 for consisting of a parallel signal mode with lower transmission rate and less power consumption service; wherein, the power portion commonly supports two modes. Please refer to FIG. 2, which illustrates an enlarge view of the terminals 12 of the multimedia storage device, which enlarges the signal layout of the front end and rear end of the terminals 12 according to one prefer embodiment of the present invention.

Therefore, the MMS mode and SUSB mode commonly construct an Intelligent Stick Interface (ISI) standard. Wherein, the MMS mode is referred to the MMC version 4.0 specification and partially modified by the inventor of the present invention to form the parallel data transmission protocol with synchronous clock, and the MMS interface protocol is compatible to the MMC version 4.0 specification and its former version; and the SUSB protocol also is referred to the USB version 2.0 specification and partially modified by the inventor of the present invention to form the differential signals data transmission protocol, and the SUSB interface protocol is compatible to the USB version 2.0 specification and its former version. Wherein, the connector 50 comprises for example but not limited to at least 10 terminals so as to connect with the terminals of the ISI interface.

The controller 20 is positioned on the printed circuit board 10 and coupled to the terminals 12 for controlling the operation of the multimedia storage device 1. When the multimedia storage device 1 is inserted into the connector 50 by the exposed portion 11, it can switch the connection status of the terminals 12 and the connector 50 by a suitable switching mode procedure according to the control signal sent via the connector 50. For example, the host system sends a CHMD command to the controller 20 when it will change to the ISI interface mode, and while the controller 20 receiving the command, it reconfirms the flag value of the register as the current interface mode when it finishes the current operation and enables another mode and responds (AckCHMD) to the host system via original mode for preparing mode switching, then the host system actuating another mode and completely connecting mode; the controller 20 changes the flag value of the register to a flag value of the new mode and turns off a kernel circuit (not shown) of the operation mode for entering a sleep status so as to reduce power consumption. In practice, for example, when a user will select high-resolution image data and transmit it to the multimedia storage device 1 by a digital camera (not shown), the digital camera executes the mode switching procedure to inform the controller 20, and the controller 20 switches the terminals 12 to the SUSB mode for executing higher transmission rate, so as to improve the transmission rate of the multimedia storage device 1. Vice versa, when the user will receive MP3 music by the digital camera (not shown), the digital camera executes the aforesaid mode switching procedure to inform the controller 20, and the controller 20 switches the terminals 12 to the MMS mode for executing lower transmission rate, so as to increase the standby time of the digital camera. Furthermore, the controller 20 further comprises a register 21 to store the operation parameters of the ISI interface, and comprises a memory unit 22 for storing the firmware of the controller 20, wherein, the firmware includes the determining procedure of the MMS mode and SUSB mode of the present invention, the detail description of the determining procedure please refer to FIG. 4. The determining procedure comprises two portions: one is Power On Sequence (POS) and another is Mode Swap Sequence (MSS). According to the POS, the controller 20 can confirm the host system connected to the multimedia storage device 1 that supports either the MMS mode or the SUSB mode when the power is turned on; the host system can use the MSS procedure to further availably control the controller 20 for sending suitable command to switch operation mode, and the controller 20 must use a register 21 to record the supported protocol version of the multimedia storage device 1 for supporting the host system to identify the multimedia storage device 1 whether supporting the POS procedure, MSS procedure or not.

The storage unit 30 is positioned on the printed circuit board 10 and coupled to the controller 20 for storing data, for example but not limited to an image or audio data, wherein the storage unit 30 is for example but not limited to a flash memory, ROM or EEPROM according to the requirement and application of the multimedia storage device 1.

In one prefer embodiment of the present invention, the SUSB mode has higher transmission rate, and comprises a 5.0V, 3.3V or 1.8V operation voltage (e.g., the voltage drop between the $V_{power}$ and GND), and a set differential signals {D0, D1} for transmitting data as well as a 60 MB/Sec transmission rate. The MMS mode comprises a 3.3V or 1.8V operation voltage (e.g., the voltage drop between the $V_{power}$ and GND), and 1 bit {D2}, 2 bits {D2, D3} or 4 bits {D2, D3, D4, D5} data bus width, and 0~20 MHz or 26 MHz operation frequency according to the requirement and application of the system.

The difference between the SUSB mode of the present invention and the standard USB version 2.0 is that the SUSB mode of the present invention can operate under 3.3V or 1.8V and provide the same transmission rate as the 5.0V, therefore, it can consume less power than the standard USB version 2.0; meanwhile, the present invention simultaneously comprises the POS procedure and the MMS procedure as well as supports relative mode switching command, the aforesaid advantages of the present invention are obviously better than the traditional USB version 2.0 protocol.

Additionally, the difference between the MMS mode of the present invention and the standard MMC version 4.0 is that the data width of the MMS mode of present invention is 1 bit, 2 bits and 4 bits respectively, but the data width of the standard MMC version 4.0 is 1 bit, 4 bits and 8 bits respectively. The reason why the present invention doesn't choose the 8 bits data width is that the total transmission rate of the standard MMC version 4.0 are 52 MBytes/Sec×8=416 Mbits/Sec when it chooses the 8 bits data width and operates under 52 MHz frequency, but the 416 Mbits/Sec total transmission rate is less than the 60 MBytes/sec×8=480 Mbits/Sec of SUSB mode. Namely, the present invention chooses the SUSB mode when it needs to operate in higher transmission rate environments, and the present invention chooses the MMS mode when it needs to operate in lower transmission rate and power saving environments. Therefore, in one preferably MMS mode embodiment of the present invention, it discards the 8 bits data width and 52 MHz operation frequency of the standard MMC version 4.0, besides the SUSB mode already provides the higher transmission rate than the standard MMC version 4.0 with 8 bits data width and 52 MHz operation frequency, it also reduces the terminals 12 of the ISI interface to 10 terminals (the standard MMC version 4.0 requires 13 terminals) so as to simply design the connector.

Referring to FIG. 3, which illustrates a format of the SWITCH command for setting the data width of the MMS mode according to one prefer embodiment of the present invention. As shown in the Fig., in the MMS mode, the controller 20 receives the SWITCH command from the host system by using a one bit command signal (CMD) for changing the data width of the MMS mode, the SWITCH command has a 8 bits width argument, and it has 1 bit data width (default value) when the argument has a decimal value 0, thus the MMS mode just needs to use the D2 terminal; and the MMS mode has a 4 bits width when the argument has a decimal value 1, thus the MMS mode needs to use the D2, D3, D4 and D5 terminals; as well as the MMS mode has a 2 bits width when the argument has a decimal value from 0 to 255 exception 0, 1 and 2, for example but not limited to 3, thus the MMS mode needs to use the D2 and D3 terminals. Wherein, the 1 bit data width is the default value of the MMS mode of the present invention so as to ensure that it is compatible to the standard MMC version 3.2 and its former version. The present invention also can partially compatible to the standard MMC version 4.0 by using aforesaid data width design (e.g., 1 bit and 4 bits data width and 0-20 MHz and 26 MHz operation frequency).

Figure 4:
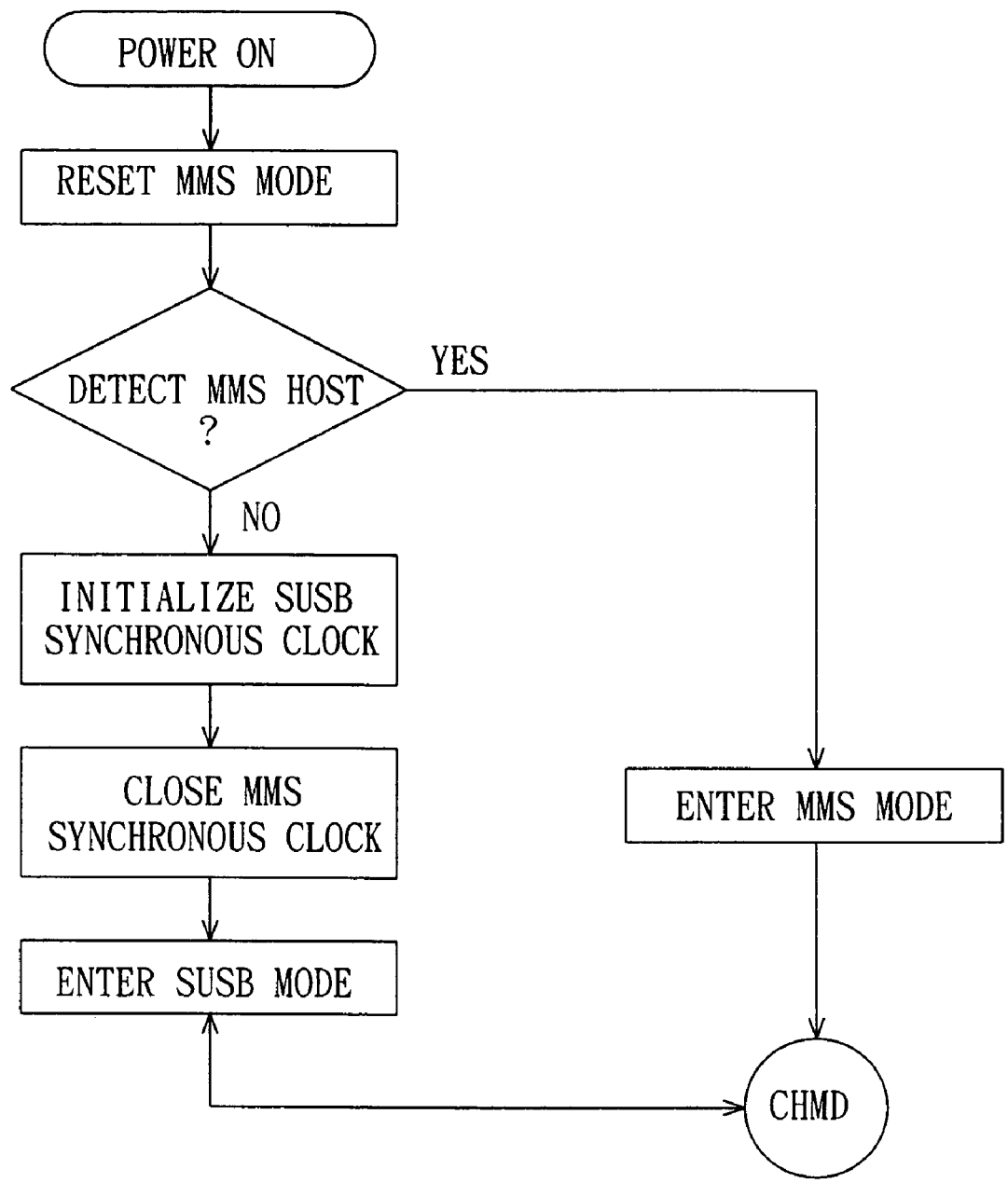
FIG. 4 illustrates a flowchart of the method for determining the operation mode of the multimedia storage device according to one prefer embodiment of the present invention.
Figure 5:
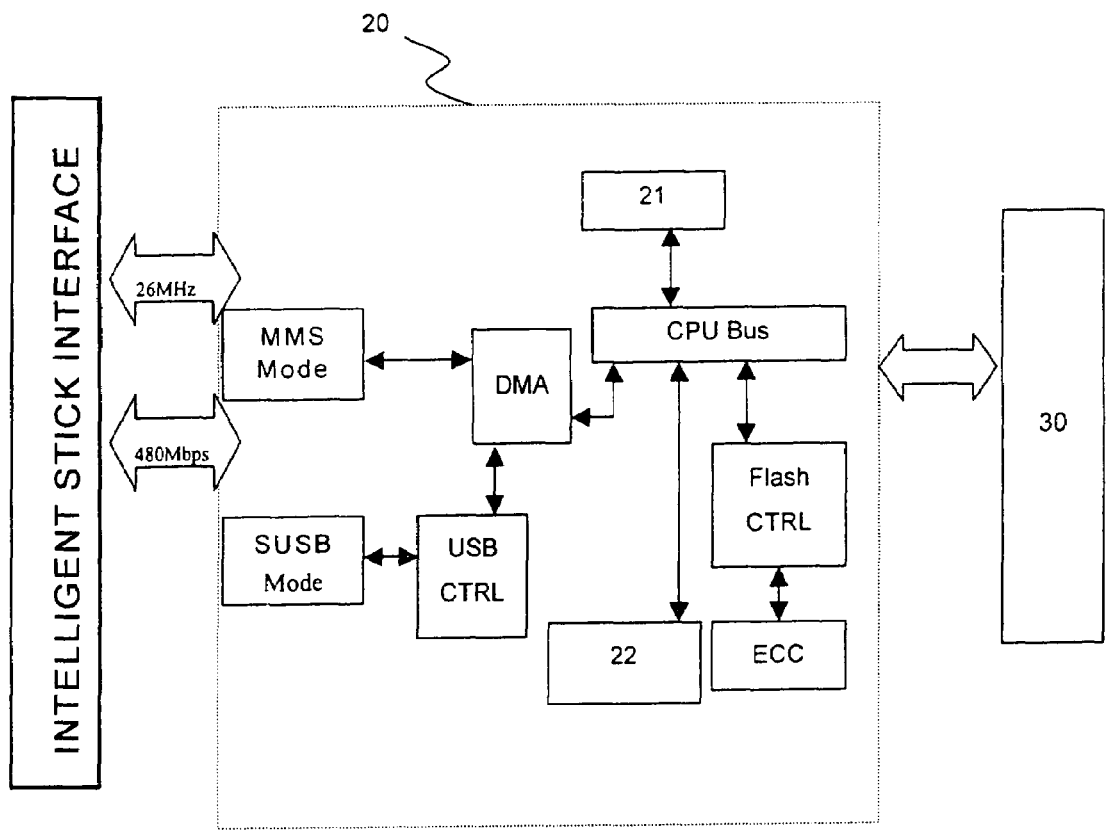
FIG. 5 illustrates a circuit diagram of the multimedia storage device according to one prefer embodiment of the present invention.

Referring to FIG. 4, which illustrates a flowchart of the method for determining the operation mode of the multimedia storage device according to one prefer embodiment of the present invention. As shown in the Fig., the method for the judgment of the MMS mode or SUSB mode of the present invention comprises the steps of: resetting the multimedia storage device 1 and setting it into the MMS mode when the multimedia storage device 1 is inserted into the connector 50 of the host system (Step 1); the multimedia storage device 1 detects that if there is an MMS host existing or not (Step 2); if there is an MMS host existing then setting the multimedia storage device 1 to the MMS mode and keeping the connector 50 continually conducting with the multimedia storage device 1 by the MMS terminals (Step 3); and if there is not an MMS host existing then setting the multimedia storage device 1 to the SUSB mode and initializing a Chirp sequence of the USB version 2.0 then switching to the SUSB mode with the SUSB terminals of connector 50 (Step 4). Thereby using this criterion for judgment, it previously sets the multimedia storage device 1 of the present invention into the MMS mode that consumes less power when the host system is powered on and switches to the SUSB mode that consume more power when it requires higher transmission rate it doesn't detect the MMS host existing, so that the multimedia storage device 1 of the present invention simultaneously has ability of higher transmission rate and lower power consumption.

Therefore, the present invention can switch the multimedia storage device 1 to an MMS mode or a SUSB mode by a control signal received from the host system so as to control the transmission rate and power consumption of the multimedia storage device 1, therefore it can overcome the aforesaid drawbacks of the prior art storage device.

Additionally, the interface technology disclosed in the present invention can also generally be applied to various computer fields, especially, the multimedia data processing or communication device, for example but not limited to a wireless transmission apparatus, MPEC 4, H.264 etc, image playing and recording apparatus can use the ISI interface of the present invention and use the MMS mode or SUSB mode of the ISI interface to control the transmission rate and power consumption of the multimedia processing or communication device.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A multimedia storage device, being inserted into a connector of a computer device or a portable device so that said computer device or portable device can transmit data to or receive data from said multimedia storage device, wherein, said multimedia storage device comprises:
   a printed circuit board, for conveying the following elements, having at least one terminal been formed on one end of said printed circuit board and exposed outwardly, wherein one end of said printed circuit board can be inserted into said connector;
   a controller, positioned on said printed circuit board and coupled to said terminal, a single working interface of said controller having at least two operation modes including both a parallel data transmission with synchronous clock mode and a differential signal transmission mode, for providing suitable data transmission rate and power consumption to said computer device or portable device, said operation modes being switched by a control signal or command from said computer device or said portable device to switch the connecting status of said connector, thereby controlling said multimedia storage device to switch between said parallel data transmission with synchronous clock mode and said differential signal transmission mode; and
   a storage unit, positioned on said printed circuit board and coupled to said controller for storing data;
   said terminals further comprise $V_{Power}$, D2, D3, D4, D5, CLK, CMD, GND signal terminals respectively for forming a completely Multi Media Stick mode (Multi Media Stick, MMS), wherein, said D2, D3, D4 and D5 terminals are parallel data bus with synchronous clock, said CLK terminal is a clock signal, said CMD terminal is a command signal and said $V_{Power}$ and GND terminals are power signals;
   said MMS mode uses 1 bit data width to transmit data when it operates at said 0~20 MHz frequency, and uses 2 bit data width to transmit data when it operates at said 26 MHz frequency;
   said controller comprises an Intelligent Stick Interface, a register unit and a memory unit, wherein, said Intelligent Stick Interface further comprises a Multi Media Stick (MMS) mode and a Smart Universal Serial Bus (SUSB) mode, and said register unit providing a flag value of said operation mode and a specification version of said multimedia storage device as well as said memory unit for storing a firmware data; and
   said firmware data further comprises a host/reader recognition logic for determining which interface operation mode should work on, said host/reader recognition logic further comprises a Power On Sequence (POS) and a Mode Swap Sequence (MSS) for providing a mode judgment standard and a switching mode standard, said procedure further comprises the following steps of:
   the POS sequence, including resetting said multimedia storage device into said MMS mode, meanwhile, detecting an MMS host existing or not when said multimedia storage device is inserted into said connector of a computer device or a portable device;
   if there is an MMS host existing then setting said multimedia storage device to said MMS mode;
   if there is not an MMS host existing then setting said multimedia storage device to said SUSB mode and initializing a Chirp sequence and switching to said SUSB mode; and
   the MMS sequence, including sending a change mode command (CHMD) to said controller when said host of computer device or portable device will change the operation mode of said interface, while said controller receiving said command, enabling another mode and responding (AckCHMD) to said host system via original mode for preparing mode switching, then said host actuating another mode and completely connecting mode; said controller changing the value of said register to a flag value of said new mode and turning off a kernel circuit of said operation mode for entering a sleep status so as to reduce power consumption.

2. The multimedia storage device as claimed in claim 1, wherein said terminals further comprise $V_{Power}$, D0, D1 and GND signal terminals for forming a completely Smart Universal Serial Bus mode (Smart USB, SUSB), wherein, said D0 and D1 are differential signals for transmitting data, and said $V_{Power}$ and GND are power signals.

3. The multimedia storage device as claimed in claim 1, wherein said D2, D3 and D4 terminals are adjacent to said $V_{Power}$, D0, D1 and GND terminals.

4. The multimedia storage device as claimed in claim 1, wherein said MMS mode comprises a 3.3V or 1.8V operation voltage and 1 bit, 2 bits or 4 bits data bus width, and 0~20 MHz or 26 MHz operation frequency so as to provide less power consumption.

5. The multimedia storage device as claimed in claim 1, wherein said SUSB mode comprises higher transmission rate, and comprises a 5.0V, 3.3V or 1.8V operation voltage and a set differential signals for transmitting data.

6. The multimedia storage device as claimed in claim 1, wherein said MMS mode using 1 bit, 2 bits or 4 bits data width to transmit data is selected by 1 bit width command of said controller.

7. The multimedia storage device as claimed in claim 1, wherein said storage device is a flash memory, ROM or EEPROM, preferably.

8. The multimedia storage device as claimed in claim 1, wherein it further comprises a housing, covered over said printed circuit board for protecting said multimedia storage device.

9. A method for determining an interface operation mode of a digital data processing device, wherein, a single interface comprises a parallel data transmission with synchronous clock mode (A mode) and a differential signal transmission mode (B mode), said method comprising a Power On Sequence (POS) and a Mode Swap Sequence (MSS) for providing a mode judgment standard and a switching mode standard when said system is initialized, said method further comprises the following steps of:

the POS sequence, including resetting said multimedia storage device into said A mode, meanwhile, detecting an A host existing or not when said multimedia storage device is inserted into said connector of a computer device or a portable device;

if there is an A host existing then setting said multimedia storage device to said A mode; and if there is not an A host existing then setting said multimedia storage device to said B mode and switching to said B mode;

the Mode Swap Sequence (MMS) sequence, including sending a switching mode command (CHMD) to said controller when said host of computer device or portable device will change operation mode of said interface, while said controller receiving said command, enabling another mode and responding (AckCHMD) to said host system via original mode for preparing mode switching, then said host actuating another mode and completely connecting mode; said controller changing the value of said register to a flag value of said new mode and turning off a kernel circuit of said operation mode for entering a sleep status so as to reduce power consumption;

said A mode is a Multi Media Stick mode (Multi Media Stick, MMS) and said B mode is a Smart USB mode (SUSB mode); and said digital data processing device has a 5.0V, 3.3V or 1.8V operation voltage when it operates in said SUSB mode.

10. The method for determining an interface operation mode of a digital data processing device as claimed in claim 9, wherein said digital data processing device has a 3.3V or 1.8V operation voltage and 1 bit, 2 bits or 4 bits data bus width, and 0~20 MHz or 26 MHz operation frequency when it operates in said MMS mode.

* * * * *